(12) United States Patent
Valerstain

(10) Patent No.: US 9,479,210 B1
(45) Date of Patent: Oct. 25, 2016

(54) MOBILE DEVICE CASE HAVING AN ERGONOMIC BATTERY HANDLE

(71) Applicant: Spectrum Trading Corp, North Miami Beach, FL (US)

(72) Inventor: Deborah Valerstain, North Miami Beach, FL (US)

(73) Assignee: Spectrum Trading Corp., North Miami Beach, FL (US)

( * ) Notice: Subject to any disclaimer, the term of this patent is extended or adjusted under 35 U.S.C. 154(b) by 0 days.

(21) Appl. No.: 14/839,145

(22) Filed: Aug. 28, 2015

(51) Int. Cl.
*H04M 1/00* (2006.01)
*H04B 1/3883* (2015.01)
*H04B 1/3888* (2015.01)

(52) U.S. Cl.
CPC .......... *H04B 1/3883* (2013.01); *H04B 1/3888* (2013.01)

(58) Field of Classification Search
CPC .......... H02J 7/0044; H02J 2007/0062; A45C 2011/003; B60R 2011/0059
USPC ..................................... 455/575.8
See application file for complete search history.

(56) References Cited

U.S. PATENT DOCUMENTS

| | | | |
|---|---|---|---|
| 2011/0084081 A1 | 4/2011 | Chung et al. | |
| 2012/0100398 A1* | 4/2012 | Lee | H01M 2/1066 429/7 |
| 2014/0232343 A1* | 8/2014 | Tadd | H02J 7/0042 320/114 |
| 2015/0156297 A1* | 6/2015 | Crawford | H04B 5/0037 455/26.1 |
| 2015/0364875 A1* | 12/2015 | Ginsberg | H01R 13/72 320/114 |
| 2016/0028429 A1* | 1/2016 | Crawford | H04B 5/0037 455/575.8 |

* cited by examiner

*Primary Examiner* — Sam K Ahn
*Assistant Examiner* — Fabricio R Murillo Garcia
(74) *Attorney, Agent, or Firm* — Jesus Sanchelima; Christian Sanchelima

(57) ABSTRACT

A mobile device case having an ergonomic handle mounted thereon using a ball and socket assembly to permit the handle to retract, spin, and rotate 360-degrees. The ergonomic handle is also an external battery so that a user can charge the mobile device while holding the handle to prevent injury to the wrist and/or hands during prolonged use of the mobile device.

10 Claims, 5 Drawing Sheets

MOBILE DEVICE CASE HAVING AN ERGONOMIC BATTERY HANDLE

BACKGROUND OF THE INVENTION

1. Field of the Invention

The present invention relates to an ergonomic mobile device case and, more particularly, to such a mobile device case having a handle capable of 360 degree range of movement and serving as an external battery.

2. Description of the Related Art

Several designs for mobile device cases have been designed in the past. None of them, however, include a mobile device case including a handle that can be rotated 360 degrees and serve as an external battery that can be plugged into the mobile device through the case.

Applicant believes that a related reference corresponds to U.S. patent application No. U.S. Ser. No. 12/898,364 filed by Marware, Inc. for a case for portable media player with integral handles. However, it differs from the present invention because it does not teach of an ergonomic handle that is also an external battery and is counted to the rear surface of the mobile device case using a ball and socket assembly to provide the handle with a full range of motion. Also, the Marware application only teaches of a handle means that can cooperate with a user's fingers. It does not teach, as the present invention does, of a handle means that can be ergonomically gripped by a user's entire hand and be moved in a plurality of directions.

Other documents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a mobile device case that includes a handle to allow users to ergonomically maneuver a mobile device and prevent injury to a user's hand or wrist during prolonged mobile device use.

It is another object of this invention to provide a mobile device case having a handle that can rotate 360 degrees to maximize the comfort and effectiveness when using the mobile device.

It is still another object of the present invention to provide a mobile device case with an ergonomic handle that also acts as an external battery to allow a user to recharge the mobile device while using it.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
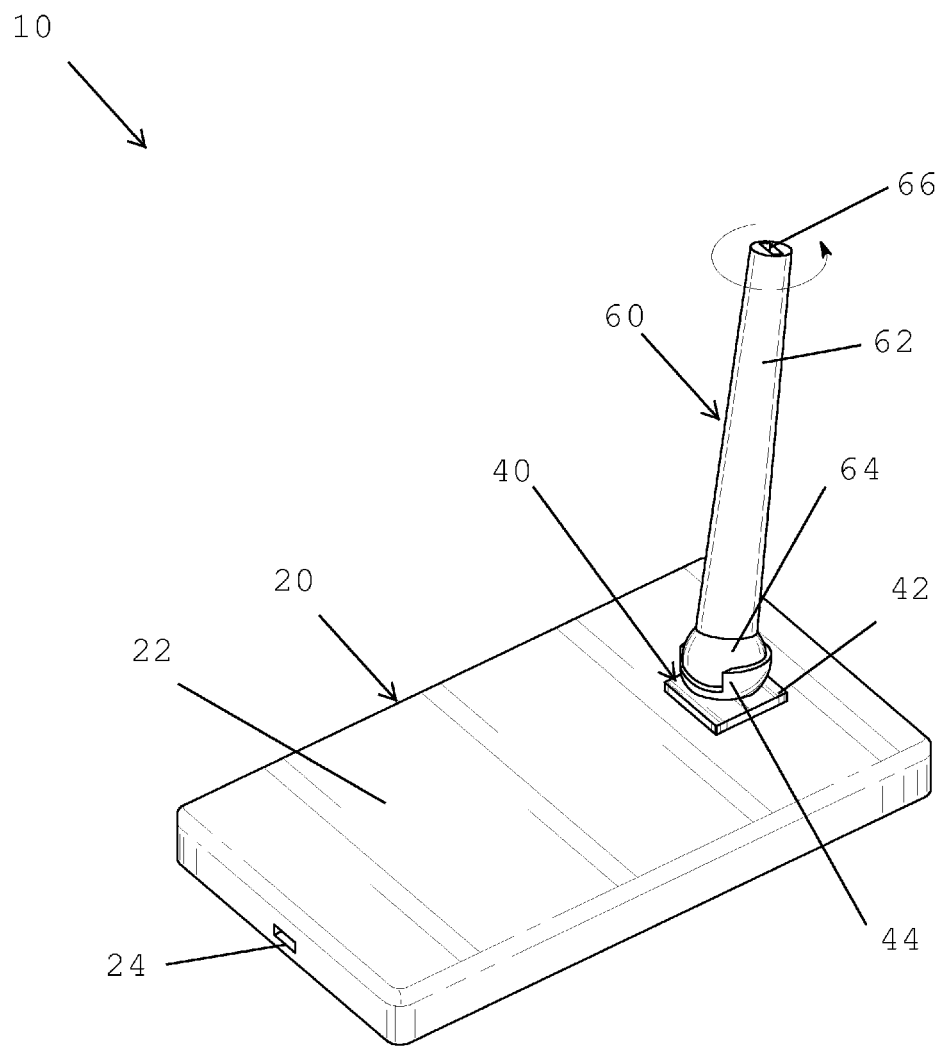
FIG. 1 represents a rear isometric view of the present invention showing battery handle 62 allowed to rotate 360 degrees about ball and socket mounting assembly 40.

Referring now to the drawings, where the present invention is generally referred to with numeral 10, it can be observed that it basically includes mobile device case assembly 20, ball and socket assembly 40, battery handle assembly 60, and charging cable 80.

Figure 1A:
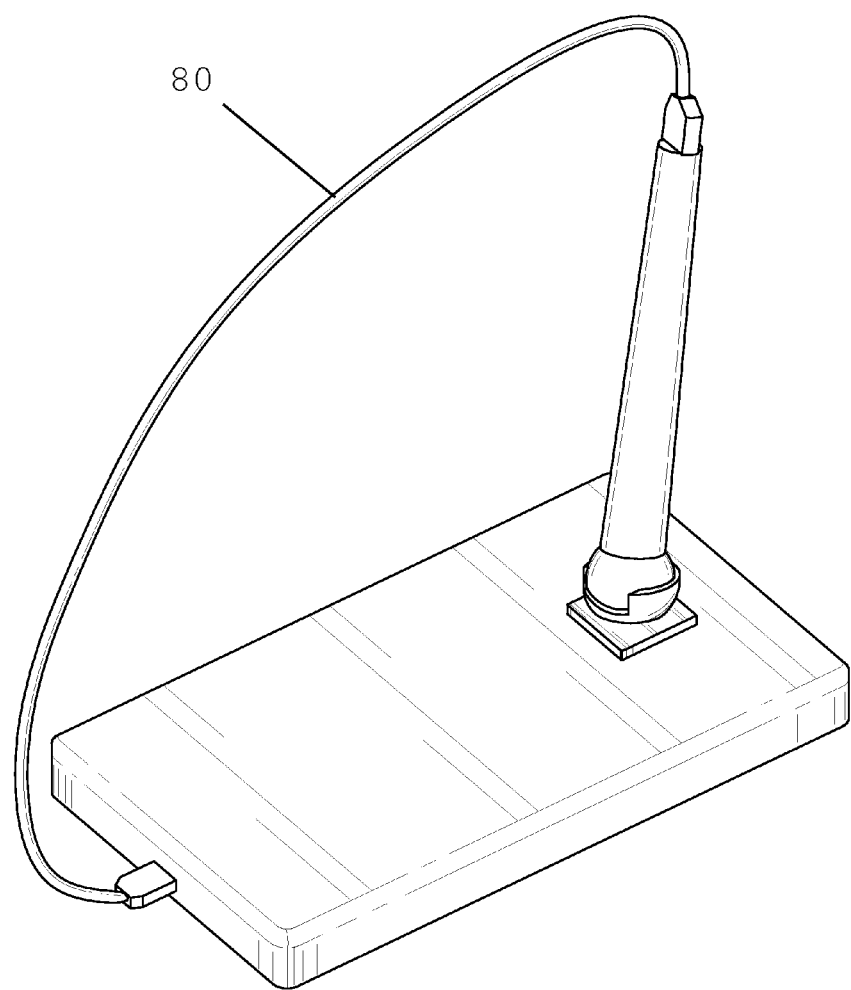
FIG. 1A shows a rear isometric view of the present invention wherein handle charging port 66 is connected to a mobile device's charging port using charging cable 80.
Figure 2:
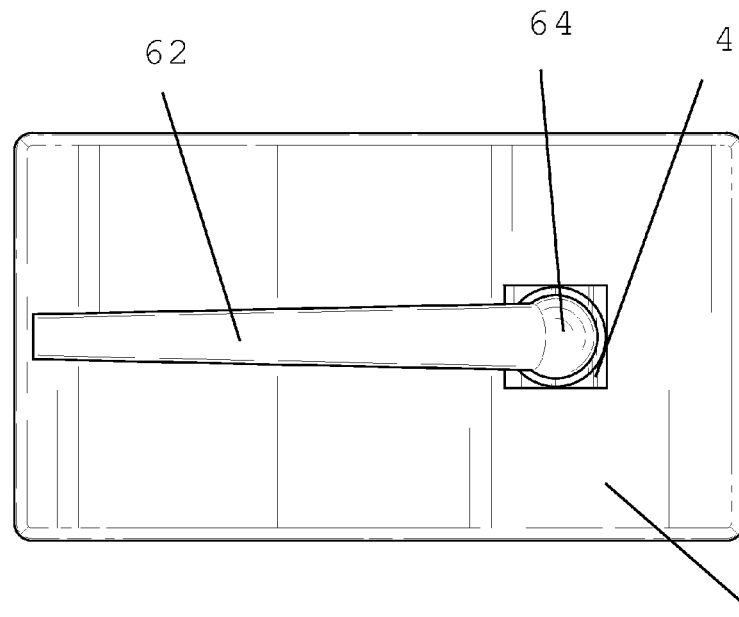
FIG. 2 illustrates a rear elevational view of the present invention wherein battery handle 62 is in its retracted position resting against the back of mobile device case 22.
Figure 3:
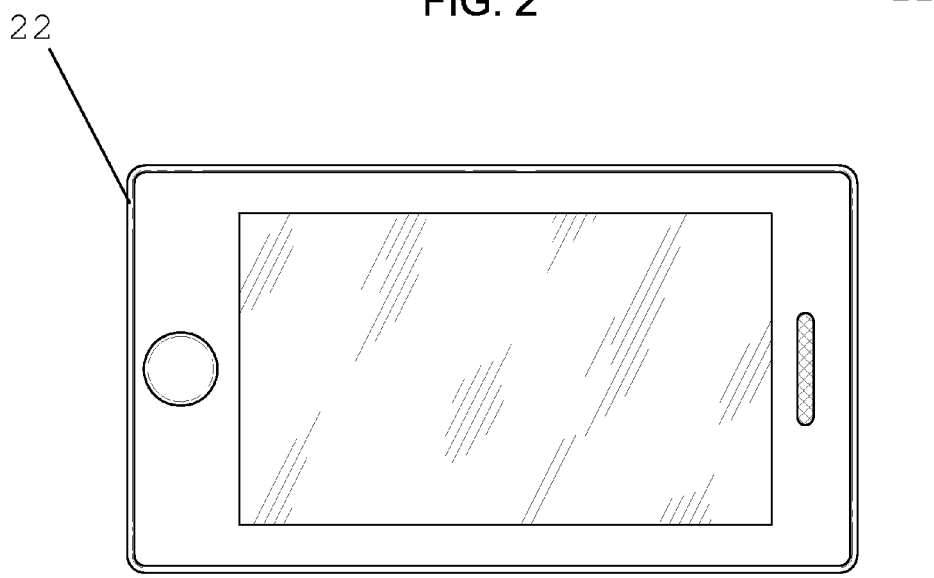
FIG. 3 is a representation of a front elevational view of the present invention mounted to a mobile device.

As shown in FIG. 1, mobile device case assembly 20 includes mobile device case 22 that cooperates with the size and shape of a plurality of mobile devices such as smartphones and tablets. Mobile device case 22 is mounted flush to a mobile device. As also shown in FIG. 1, mobile device case assembly 20 also includes charging port opening 24 located at the bottom wall of mobile device case 22 and at a location that cooperates with the charging port of a mobile device. Mobile device case 22 can be made of a malleable, semi-rigid, or rigid material to protect a mobile device from damage caused by impact against surfaces. As seen in FIG. 1A, charging cable 80 is used to connect battery handle assembly 60 to the charging port on a mobile device, thereby charging the mobile device.

Figure 7:
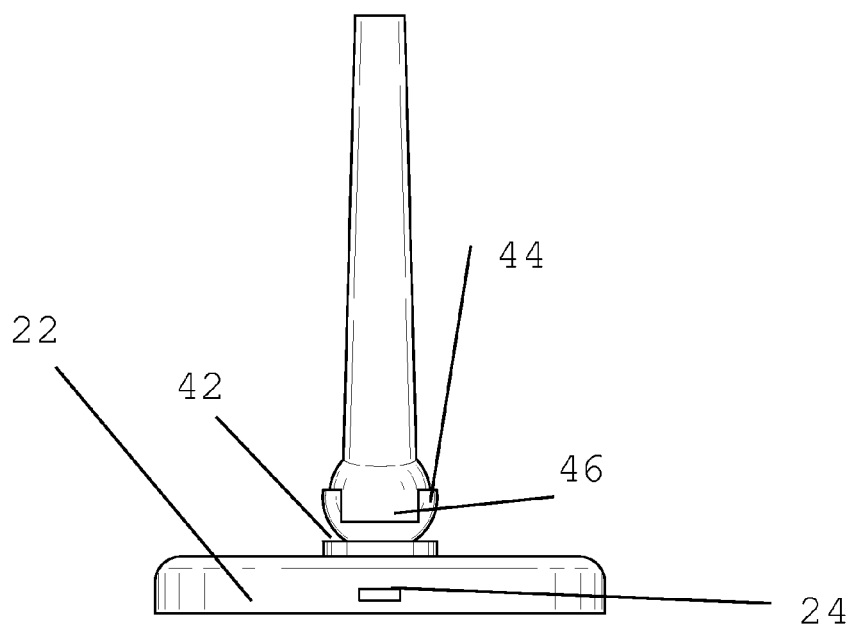
FIG. 7 is a bottom elevational view of the present invention showing charging port opening 24 and cutout 46 that allows battery handle 62 to retract against the rear surface of mobile device case 22.

As shown in FIGS. 3-6, ball and socket assembly 40 includes mounting plate 42 that is mounted flush to the rear of mobile device case 22. It can be mounted to mobile device case 22 using adhesive material, screws, being molded on, or other fastening means that accomplish the same result. Mounting plate 42 is also mounted using the same or similar mounting means to socket member 44 that includes cutout 46, as seen in FIG. 7.

Figure 4:
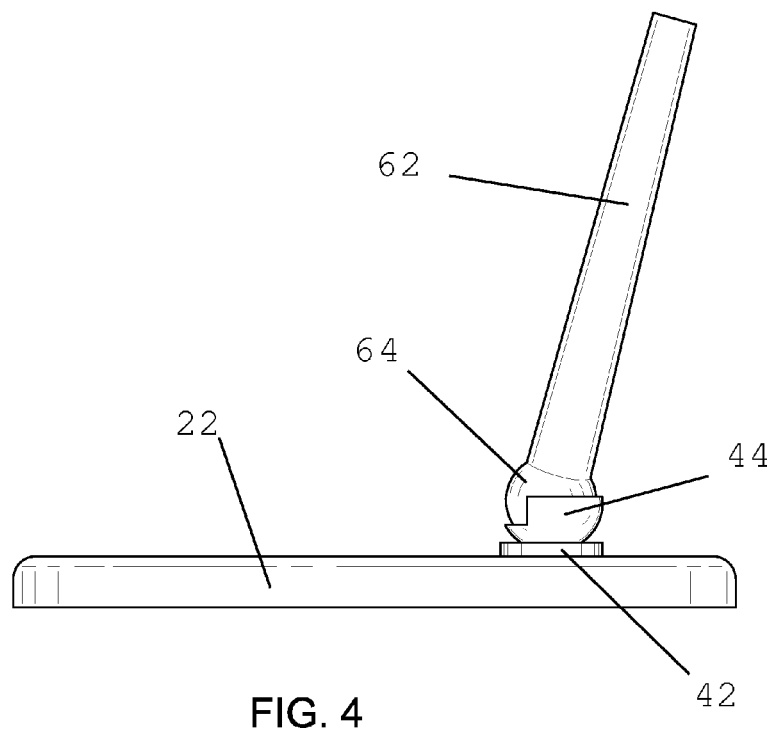
FIG. 4 is a left side elevational view of the present invention showing battery handle 62 in the raised position.
Figure 5:
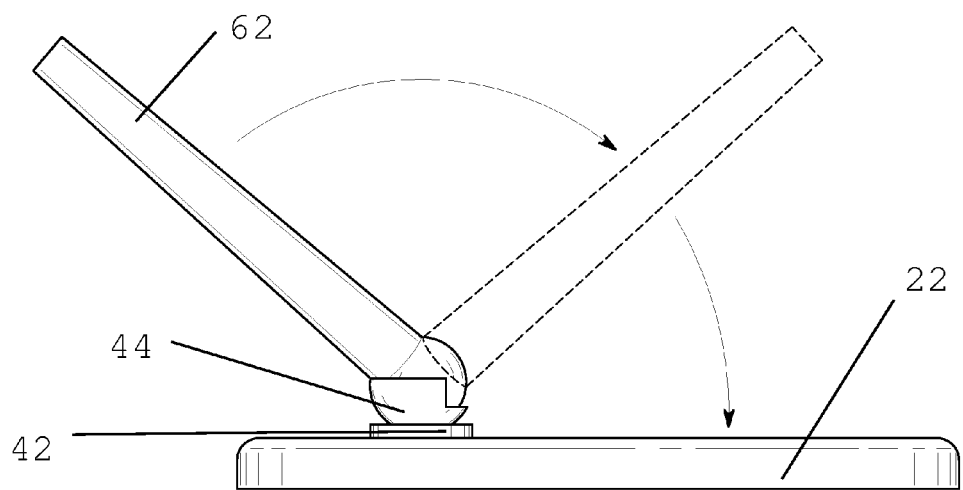
FIG. 5 shows a right side elevational view of the present invention showing the range of forward and back motion of battery handle 62.
Figure 6:
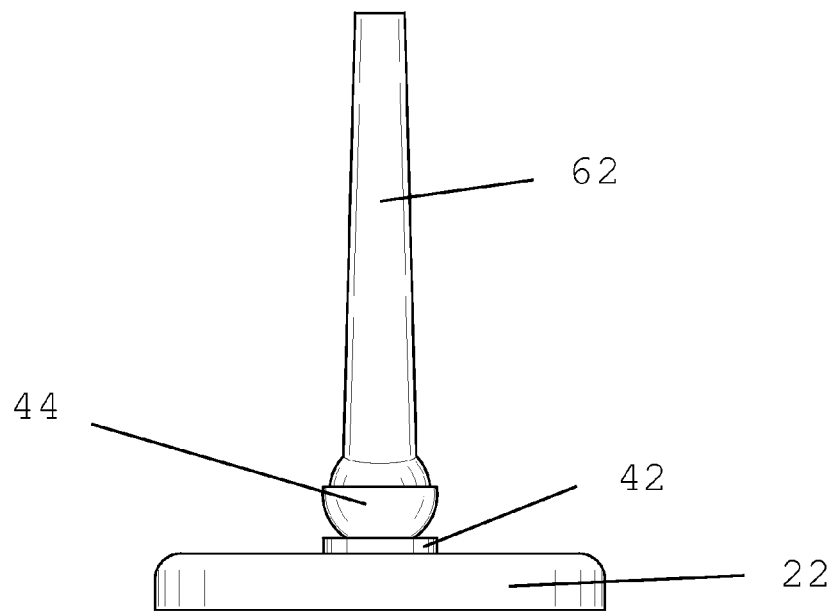
FIG. 6 is a top elevational view of the present invention wherein mounting plate 42 is seen flush against the rear surface of mobile device case 22. Socket member 44 is seen mounted to mounting plate 42 and receiving battery handle 62.

As shown in FIG. 1, battery handle assembly 60 includes longitudinal battery handle 62 that is of a length substantially similar to the length of mobile device case 22. Battery handle 62 is also of a predetermined dimension long enough so that hands or larger dimensions can comfortably use and articulate it. As shown in FIG. 4, first distal end of battery handle 62 is ball member 64 that cooperates with socket member 44 to permit a 360-degree range of motion. Second distal end of battery handle 62 includes charging port 66.

Cutout 46 allows battery handle 62 to retract and rest substantially parallel with and flush against mobile device case 22. Ball member 64 cooperates with socket member 44 to allow battery handle 62 to rotate or spin 360 degrees with respect to mounting plate 42 in any retracted or upright position. Battery handle 62 can also spin about mounting plate 42 in any partially retracted or partially upright position. A user is able to hold battery handle 62 while using a mobile device for prolonged periods of time to prevent injury to a user's wrist and/or hands.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A mobile device case comprising:
a mobile device case assembly having dimensions that can cooperate with a plurality of mobile devices to be mounted thereon, said case assembly including a rear surface and a bottom surface, said rear surface is adjacent and substantially perpendicular to said bottom surface, said bottom surface including an opening to allow a first end of a charging cable to pass and connect to a charging cable receiving port of said plurality of mobile devices, said rear surface having a mounting plate mounted flush thereon at a predetermined location, said mounting plate being mounted to a socket member, said socket member receiving and mounted to a ball member, said ball member mounted to a distal-most first end of a battery handle, said ball member cooperating with said socket member to permit said battery handle to retract, spin, or rotate in any direction, said battery handle being an external battery and having a second distalmost end opposite said distalmost first end, said second distalmost end having a charging port that can be connected to said charging cable receiving port using said charging cable.

2. The mobile device case assembly subject of claim 1 wherein said battery handle has a range of motion that allows it to be retracted to a downward position along any predetermined point throughout a 360 degree radius, said battery handle can also be raised from back to its upright position from any of said downward position, said battery handle can also be spun about the 360 degree range of motion while in the upright or downward position or during any position in between said positions.

3. The mobile device case assembly subject of claim 1 wherein said socket member includes a cutout partially extending along its circumference allowing said battery handle to retract even further up to a position where said battery handle is substantially flush against said rear surface.

4. The mobile case device subjection of claim 1 wherein said battery handle has a longitudinal dimension that is substantially equal to the longitudinal dimension of said case assembly.

5. The mobile device of claim 1 wherein said case assembly includes a top distal end and said mounting plate is mounted on said top distal end.

6. The mobile device of claim 1 wherein said case assembly includes a bottom distal end and said mounting plate is mounted on said bottom distal end.

7. The mobile device of claim 1 wherein said case assembly is made of a rigid material.

8. The mobile device of claim 1 wherein said case assembly is made of a flexible material.

9. The mobile device of claim 1 wherein said case assembly is made of a waterproof material.

10. The mobile device of claim 1 wherein said case assembly includes a top surface opposite said bottom surface, said mounting plate is positioned near said top distal end and at a point.

* * * * *